United States Patent [19]

Huling

[11] Patent Number: 4,893,471
[45] Date of Patent: Jan. 16, 1990

[54] INLET AIR DEMOISTURIZING SYSTEM FOR A CRYOGENIC ENGINE AND METHOD FOR OPERATION THEREOF

[75] Inventor: Don W. Huling, King County, Wash.
[73] Assignee: The Boeing Company, Seattle, Wash.
[21] Appl. No.: 176,848
[22] Filed: Apr. 4, 1988
[51] Int. Cl.$^4$ .............................. F02K 9/42
[52] U.S. Cl. ........................... 60/204; 60/257; 60/260; 60/39.093
[58] Field of Search ............... 60/257, 260, 39.093, 60/204, 728, 730; 62/7, 9, 36

[56] References Cited

U.S. PATENT DOCUMENTS

| | | | |
|---|---|---|---|
| 2,812,899 | 11/1957 | Meschino . | |
| 2,832,528 | 4/1958 | Spears, Jr. . | |
| 3,002,340 | 10/1961 | Landerman | 60/260 |
| 3,557,557 | 1/1971 | Prachar . | |
| 4,771,601 | 9/1988 | Spies | 60/260 |
| 4,782,655 | 11/1988 | Weber | 60/728 |

FOREIGN PATENT DOCUMENTS 61951  3/1986  Japan .................................... 60/257

Primary Examiner—Donald E. Stout
Attorney, Agent, or Firm—Seed and Berry

[57] ABSTRACT

An inlet air demoisturizing system utilizes a plurality of screens between the inlet of a cryogenic engine and a heat exchanger therefor. In a first embodiment, a curtain of liquid air flows on the forward side of the screen to pre-cool the gaseous intake air below the freezing point of water. In a second embodiment, a mist of liquid air is used to pre-cool the air prior to arrival at the screen. The screen traps ice crystals precipitated from the air. In each embodiment, a second sprayer washes the screen with a curtain of liquid water to remove the ice crystals therefrom. Collector troughs collect the liquid air and suspended ice crystals for removal from the engine inlet.

16 Claims, 1 Drawing Sheet

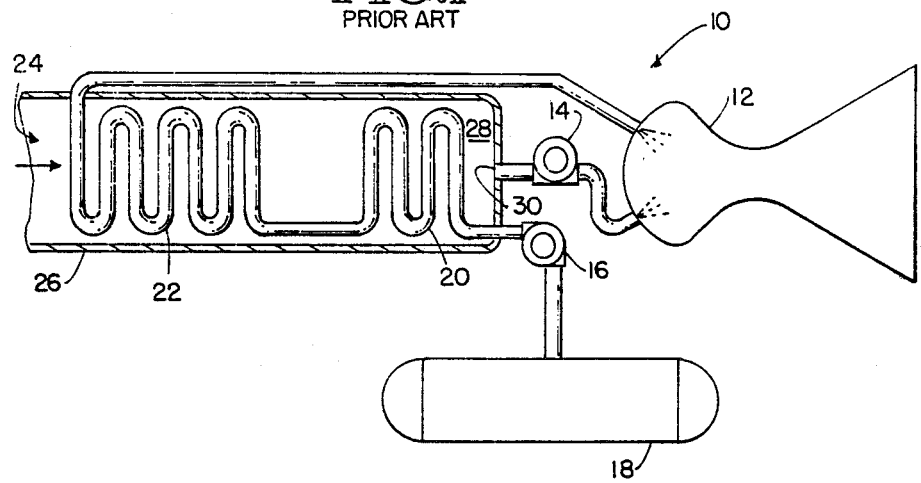
FIG. 1 PRIOR ART
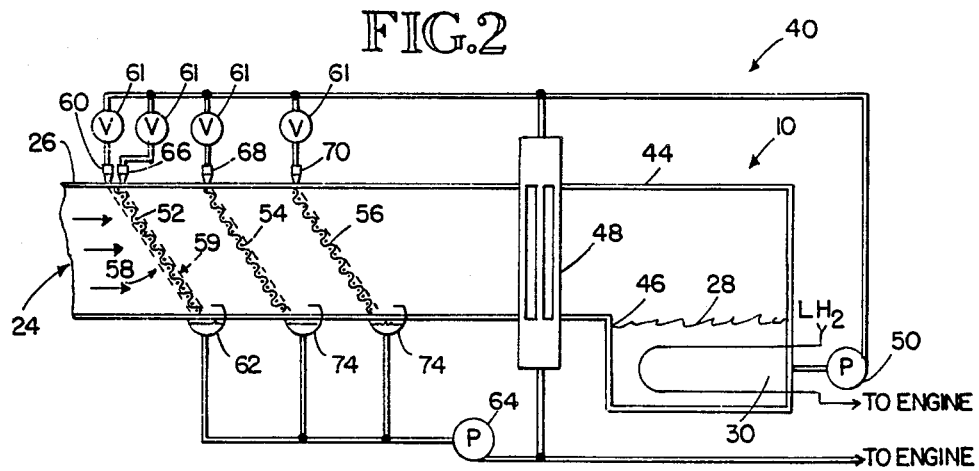
FIG. 2
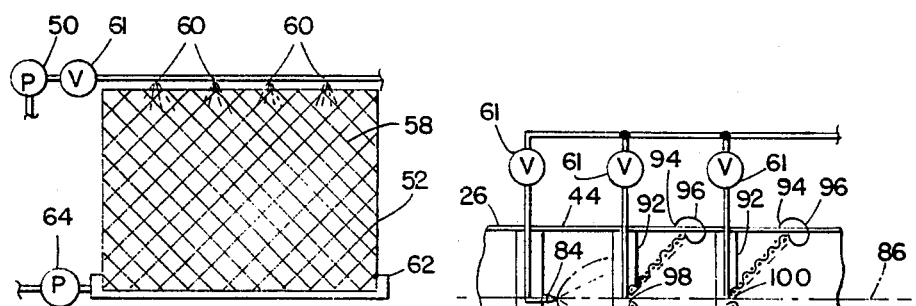
FIG. 2A
FIG. 3

INLET AIR DEMOISTURIZING SYSTEM FOR A CRYOGENIC ENGINE AND METHOD FOR OPERATION THEREOF

TECHNICAL FIELD

The invention relates to methods and apparatus for preventing ice formation in air breathing engines. More specifically, the invention relates to inlet air demoisturizing systems for cryogenic-fueled, air-breathing engines.

BACKGROUND ART

A variety of fuels are available for aircraft engines. For certain purposes, cryogenic fuels, such as liquid hydrogen, liquid methane, etc., are particularly desirable because of the large amount of cooling capability stored in the cryogenic fuel itself. For example, at sea level, atmospheric pressure, gaseous hydrogen must be cooled to a temperature of approximately 36.5° RANKINE (36.5° F. above absolute zero) before the hydrogen gas will condense into a liquid state. Substantial heat energy must therefore be removed from the hydrogen gas. Similarly, other cryogenic fuels have this advantageous property. The potential cooling capacity represented by this removed heat energy can be used to perform useful work in a cryogenic engine. In many conventional, air-breathing, cryogenic engines, the potential cooling capacity of liquid hydrogen represented by the heat energy removed, is used to produce liquid air (primarily liquid nitrogen and liquid oxygen) from gaseous intake air of the engine. The liquid air can then be used as an oxidizer when combined with liquid hydrogen during combustion. Thus, the aircraft need only carry liquid hydrogen as a fuel.

FIG. 1 illustrates a liquid air cycle, cryogenic engine which is especially advantageous for transatmospheric travel. That is, the engine shown in FIG. 1 is capable of operating from ground level through the atmosphere and above the atmosphere. In contrast, the cryogenic engine shown in FIG. 1 of U.S. Pat. No. 3,557,557, to Prachar, describes a turbine-type cryogenic engine which is useful for atmospheric travel.

The liquid air cycle engine 10 of FIG. 1 uses a rocket motor-type combustion chamber 12 to which is delivered liquid air by a liquid air pump 14 and liquid hydrogen or other cryogenic fuel by a liquid pump 16. Cryogenic fuel is drawn from a storage tank 18 to a condenser 20 and pre-cooler which initially cools the gaseous air 24 from an inlet 26 of the engine to form liquid air 28 at an outlet 30 of the liquefied air sump. Engines of this type are particularly advantageous for transatmospheric travel in that the pre-cooler and condenser can be designed with sufficient surface area, and the hydrogen or other cryogenic fuel to liquid air oxidizer ratio selected such that the engine produces more liquid air than it burns. The excess liquid air can be stored in a separate liquid air storage tank (not shown) for use after the vehicle has traversed the atmosphere into outer space. In addition, the engine design is highly advantageous in that the combustion chamber 12 can be physically removed from the condenser and pre-cooler section of the engine, allowing substantial flexibility in the design of the vehicle.

Typically, cryogenic engines of the type described above use a heat exchanger to transfer heat energy from the gaseous inlet air to the stored liquid hydrogen fuel. A common problem during operation of engines of this type is icing of the heat exchanger, which results when water vapor in the gaseous air (humidity) contacts the heat exchanger. Icing reduces the efficiency of the heat exchanger and can result in complete failure of the engine.

U.S. Pat. No. 3,557,557, to Prachar, illustrates one prior art technique for "freezing out" water vapor from the gaseous inlet air before this air is introduced into a flow-type heat exchanger in which liquid hydrogen fuel flows around the outside of airflow tubes. Gaseous air passes through the tubes to be liquefied. Heat energy is transferred from the gaseous air, through the tubes, to the liquid hydrogen. However, before entering the airflow tubes, the gaseous air is sprayed with a fine mist of liquefied air (drawn from a supply of liquefied air already produced by the engine). The spray of liquefied air reduces the temperature of the gaseous inlet air below the freezing point of water, producing very fine ice crystals. In theory, the ice crystals will pass through the airflow tubes without the ice crystals adhering thereto. Tests have shown that the ice crystals do adhere to the condenser tubes, eventually blocking the heat exchanger.

Other conventional attempts to prevent icing of the heat exchanger include spraying the heat exchanger with an alcohol/glycol mist. Typically, this treatment only results in ice depositions forming further down in the heat exchanger. Furthermore, the introduction of alcohol/glycol into the combustion chamber of the engine with the liquefied air is undesirable.

Another prior art technique which has been discussed in the aerospace industry is to position a rotating belt made of a fine mesh screen between the engine inlet and the heat exchanger. A liquid air mist, similar to the mist used in the Prachar U.S. Pat. No. 3,557,557, is used to pre-cool the air ahead of the rotating screen belt below the freezing point of water. The rotating screen belt then traps the air crystals. A portion of the rotating screen is moved to an area outside of the airflow chamber defined by the engine to be removed by air jets, mechanical brushes and/or scrapers. Tests have shown that this technique is ineffective in removing the ice crystals as the ice crystals have a consistency similar to that of butter. The brushes merely spread the crystals along the screen, which quickly becomes clogged. In addition, an aperture must be provided in the airflow chamber for extension of the rotating belt therethrough. This is highly undesirable; and even if it were possible to remove the ice crystals, such as by air blasts, reentry of the crystals into the air stream of the engine occurs through the aperture in the airflow chamber.

Therefore, a need exists for method and apparatus which will successfully prevent formation of ice in the heat exchanger of a cryogenic engine without introducing undesirable chemicals into the liquid air oxidizer. The apparatus should be lightweight and should not degrade performance of the engine.

DISCLOSURE OF THE INVENTION

It is an object of the present invention to provide a method and apparatus for preventing the formation of ice on a heat exchanger in a cryogenic-fueled, air-breathing engine.

The invention achieves this and other objects and advantages, which will become apparent from the description which follows, by providing a screen between the engine gaseous air inlet and the heat exchanger. The temperature of the gaseous intake air is then sufficiently cooled so that any water vapor in the air precipitates as ice crystals. The ice crystals then become trapped on or adhere to the screen. The screen is continuously or periodically washed with a flow of liquid air to remove the entrapped and/or attached ice crystals through a process of flushing and/or erosion therefrom. A collector is positioned with respect to the screen to receive the flow of liquid air and ice crystals suspended therein for removal from the heat exchanger area of the engine. The removed liquid air and suspended ice crystals may then be burned in the engine combustion chamber.

In one preferred embodiment of the above-described demoisturizing system, a curtain of liquid air flows over a forward side of the screen to cool the gaseous inlet air below the freezing point of water. A second curtain of liquid air flows across the rearward side of the screen to wash the trapped frost crystals therefrom into the collector. A plurality of screens positioned in series between the gaseous air inlet and the heat exchanger may be used to assure complete removal of ice crystals from the cooled gaseous air. The screens may be sloped with respect to an airflow path so that interaction between the airflow and the sloped screens assists the flushing-/erosion action in removing the trapped and attached ice crystals from the screen and to the collectors.

In a second embodiment of the invention, a spray of liquid air is positioned substantially ahead of the first screen to cool the gaseous inlet air below the freezing point of water. Ice crystals precipitated from the gaseous air then impinge upon and adhere to the rear side of the screen and are washed therefrom by a curtain or stream of liquid air sprayed on the rearward side of the screen.

In either embodiment, the screen is a fine mesh having apertures of approximately 1/16 to ¼ inch.

BRIEF DESCRIPTION OF THE DRAWINGS

FIG. 1 is a schematic representation of a liquid air cycle engine of the type utilizing a rocket motor combustion chamber.

FIG. 2 is a schematic representation of a first embodiment of a liquid air cycle engine employing the demoisturizing system of the present invention.

FIG. 2(a) is a front elevational view of the embodiment shown in FIG. 1 illustrating the screen and a liquid air sprayer manifold.

FIG. 3 is a schematic representation of a second embodiment of a liquid air cycle engine employing the air demoisturizing system of the present invention.

BEST MODE FOR CARRYING OUT THE INVENTION

The present invention comprises a demoisturizing system and method for use with a cryogenic engine. A liquid air cycle engine is generally indicated in reference 10 in FIG. 1 to serve as an example for use with the present invention. The inventive method and apparatus are adaptable to other types of cryogenic-fueled, air-breathing engines.

A first embodiment of a demoisturizing system, generally indicated at reference 40, is schematically represented in FIG. 2. The system has a gaseous air inlet 26 for receiving gaseous air 24 from the atmosphere. The engine 10 has an airflow conduit 44 defining a sump 46 for receiving liquid air 28. An outlet 30 is provided to remove liquid air from the sump.

In contrast to the liquid air cycle engine 10 shown in FIG. 1, liquid hydrogen is used to cool the liquid air 28 in the sump, which is delivered to a pre-cooler 48 by a pump 50. That is, the liquid air in the sump and cryogenic fuel are at approximately the same temperature. Thus, liquid air may be used as the primary fluid in the pre-cooler 48 as opposed to the liquid hydrogen used in the pre-cooler 22 and condenser 20 of FIG. 1. This distinction is not significant in terms of the invention, which primarily involves the method and apparatus for removing humidity from the gaseous inlet air 24 as described below.

In the first embodiment of FIGS. 2 and 2(a), first, second and third screens 52, 54 and 56 are positioned in the airflow conduit 44 between the inlet 26 and pre-cooler 48. Each screen has a forward side 58 towards the inlet, and a rearward side 59 towards the pre-cooler.

The first screen 52 is provided with a liquid air cooling manifold 60 which sprays a curtain of liquid air across the forward side 58 of the first screen when a shutoff valve 61 is opened. The first screen is downwardly sloped at an angle of approximately 45° with respect to the airflow conduit towards a collector trough 62. The collector trough is connected to a pump 64 which removes the contents of the collector trough therefrom.

When shutoff valve 61 is opened, the curtain of liquid air on the forward side 58 of the first screen 52 cools the gaseous inlet air 24 substantially below the freezing point of water. Ice crystals are immediately formed and are entrapped by the screen. The screen has a fine mesh with apertures of between 1/16 inch to ¼ inch such that the curtain of liquid across the forward surface 58 thereof tends to run along individual wires in the screen. Thus, air is free to flow through the screen but ice crystals do not generally pass therethrough. The diameter of the ice crystals is relatively small, such that the crystals would tend to form a material having a consistency similar to that of butter if not removed from the screen. For this purpose, a liquid air washing manifold 66 identical to the liquid air pre-cooling manifold 60 is provided to wash the rearward side 59 of the first screen with a curtain of liquid air. The ice crystals are thus removed by a flushing/erosion action from the screen and suspended in the liquid air curtains which are received in the collector trough 62. The ice crystals are easily removed from the trough by pump 64 because the crystals are maintained in suspension by the liquid air.

As stated above, the aperture size selected for the screen does not substantially interfere with the flow of air through the screen. However, some pressure drop across the screen does occur, resulting in a small component of airflow parallel to the screen and in the direction of the collector trough 62. This component (in addition to the effect of gravity in a system oriented as shown in FIG. 1) assists the washing manifold 66 in directing the ice crystals to the collector trough 62.

The second and third screens 54 and 56 are positioned between the first screen 52 and the final cooler 48 to trap and remove any ice crystals which pass through the first screen 52. Both the second and third screens are provided with liquid air washing manifolds 68 and 70 and collector troughs 72 and 74 identical to the liquid air washing manifold 66 and collector trough 62 of the first screen 52. The pre-cooler 48 then cools the dehumidified gaseous air to nearly liquefaction temperature to form the liquid air 28 in the sump 46.

The number of screens provided, the slope of the screens, and size of the screen apertures are related to a number of different parameters. For example, increasing the velocity of gaseous intake air at the inlet 26 favors relatively large screen apertures to prevent substantial pressure loss across the screen. A steeper screen slope decreases the apparent diameter of the apertures. In the embodiment shown in FIG. 2, the inlet air speed is approximately 40 to 70 mph, having been previously reduced from supersonic and hypersonic speeds by a conventional supersonic shock inlet (not shown) and a chamber inlet size 26, substantially larger than an outlet (not shown) of the supersonic shock inlet. In general, the screen aperture diameter must be small enough to prevent the liquid air curtains from being blown through the screens and must be large enough to prevent undesirable, substantial pressure drops across the screens.

A second embodiment of the invention is shown in FIG. 3. In this embodiment, only second and third screens 80 and 82 are shown, but additional screens could be provided. The first screen 52 of FIG. 2 is replaced by a central liquid air sprayer 84 located along the axis 86 of the airflow conduit 44. The sprayer is located substantially ahead of the second screen 80 and produces a fine, atomized mist 88 of liquid air ahead of the screen 80 when shutoff valve 61 is opened. This is in contrast to nozzles 60 in the embodiment of FIG. 2, which produce a curtain of liquid air on the screen 52. The atomized mist 88 sufficiently cools the gaseous inlet air 24 to precipitate water vapor therein as fine ice crystals. These crystals impinge on the second screen 80 and are trapped thereby.

The second and third screens 80 and 82 are identical to the screens 52, 54 and 56 of FIG. 2, except that the screens of the second embodiment are conical and have an apex positioned toward the inlet 26 along the axis 86. Each screen also has a circumferential base 94 connected to the airflow conduit 44. Circumferential collector troughs 96 surround the bases 94 to collect and remove liquid air and suspended ice crystals from the screens 80 and 82. Each one of the screens is provided with scrubber spray nozzles 98 and 100 on the rearward side of each screen 80 and 82. These nozzles are similar to the nozzles 60 and provide an outwardly expanding curtain of liquid air to wash the trapped ice crystals from the screens. These nozzles are different from the atomizing mist nozzle 84, which produces a finely atomized mist. In contrast, nozzles 98 and 100 produce a steady stream of liquid air which tends to cling to individual wires in the screen. The embodiment of FIG. 3 is well adapted for transatmospheric vehicles which may operate at a low or negative "g" flight path during acceleration or cruise. The embodiment of FIG. 2 utilizes the downward slope of the screens 52, 54 and 56 such that gravity assists in collecting the ice crystals from the screens. Therefore, the embodiment of FIG. 2 is directed towards use in a vehicle which will experience a relatively constant acceleration environment.

Variations and additional embodiments of the inventive apparatus and method are contemplated. Each of these various embodiments envisions pre-cooling gaseous intake air below the freezing point of water to form ice crystals. The ice crystals are then trapped on screens which are washed with liquid air to remove the ice crystals therefrom. In addition, the invention is contemplated for use with cryogenic-fueled, air-breathing engines other than the type shown in FIG. 1. Therefore, the invention is not to be limited by the above description, but is to be determined in scope by the claims which follow.

I claim:

1. An inlet air demoisturizing system for a cryogenic-fueled, air-breathing engine of the type having an inlet for receiving gaseous air, an outlet for removing liquefied air, and a cross-flow heat exchanger therebetween for transferring heat energy from the gaseous air to a cryogenic fluid in the exchanger, comprising:
    a screen having forward and rearward sides positioned between the inlet and the heat exchanger, respectively, and across the inlet to entrap ice crystals;
    precipitation means, between the forward side of the screen and the inlet, for precipitating water vapor from the gaseous air in the form of ice crystals;
    washing means for providing a flow of liquid air across the rearward side of the screen to wash the entrapped ice crystals therefrom; and
    collector means for collecting liquid air and suspended ice crystals from the screen.

2. The system of claim 1 wherein the collector means includes a trough and a pump for removing collected liquid air and suspended ice crystals therefrom.

3. The system of claim 2 wherein the precipitation means includes a liquid air sprayer positioned to direct a stream of liquid air directly across the forward side of the screen so as to flow a curtain of liquid air over the forward side.

4. The system of claim 3 for use in a cryogenic engine mounted in an aircraft so as to define a top and a bottom for the engine, wherein the screen has an upper portion connected to the top of the engine and a lower portion connected to the bottom of the engine rearward of the top portion so that the screen is forwardly sloped, and wherein the collector means is located adjacent to the lower portion so that gravity and a flow component of the gaseous air assist the washing means in directing ice crystals towards the collector means.

5. The system of claim 3, including a second screen located forward of the heat exchanger, the second screen also having second washing means for providing a flow of liquid air thereacross and second collector means for collecting the liquid air and suspended ice crystals therefrom.

6. The system of claim 5 wherein the second screen has forward and rearward sides, and wherein the second washing means provides a flow of liquid air across the rearward side of the second screen in the form of a curtain.

7. The system of claim 2 wherein the precipitation means includes a liquid air sprayer positioned to direct a spray of liquid air substantially forward of the screen.

8. The system of claim 7 wherein the screen has a conical shape having an apex directed towards the inlet and a base directed towards the heat exchanger and wherein the trough means surrounds the base.

9. The system of claim 8, including a second screen positioned forward of the heat exchanger, the second screen also having second washing means for providing a flow of liquid air thereacross and second collector means for collecting the liquid air and suspended ice crystals therefrom.

10. The system of claim 1 wherein the screen has apertures of approximately 0.0625 inch to 0.25 inch.

11. A method for removing water from inlet air of a cryogenic engine of the type having an inlet for receiving gaseous air, an outlet for removing liquefied air, and a cross-flow heat exchanger therebetween for transferring heat energy from the gaseous air to a cryogenic fluid in the heat exchanger, comprising:

cooling the gaseous air below the freezing point of water prior to introduction of the gaseous air to the heat exchanger to precipitate water therefrom in the form of ice crystals;

trapping the ice crystals on a screen located between the inlet and the heat exchanger;

washing the screen with liquid air to remove the trapped ice crystals therefrom; and collecting the liquid air and suspended ice crystals from the screen.

12. The method of claim 11 wherein the screen has a forward side towards the inlet and a rearward side towards the heat exchanger, and wherein, during the cooling step, the forward side of the screen is washed with a curtain of liquid air.

13. The method of claim 12 wherein, during the washing step, liquid air flows across the rearward side of the screen.

14. The method of claim 11, including the step of directing the gaseous air to a second screen forward of the heat exchanger to trap ice crystals which pass through a first screen, washing the second screen with liquid air to remove the trapped ice crystals therefrom, and collecting the liquid air and suspended ice crystals.

15. The method of claim 11, including the step of sloping the screen with respect to an airflow direction defined by the engine so that a component of the airflow assists in removing the ice crystals from the screen during the washing step.

16. A cryogenic aircraft engine which is resistant to heat exchanger icing, comprising:

a conduit defining an airflow path;

an inlet for receiving gaseous air;

an outlet for expelling liquefied ar;

a heat exchanger in the conduit between the inlet and the outlet for transferring heat energy from the gaseous air to a cryogenic fluid in the heat exchanger;

a screen positioned in the conduit between the inlet and the heat exchanger for trapping ice crystals;

cooling means, positioned between the inlet and the screen, for cooling the gaseous air below the freezing point of water to precipitate water vapor from the gaseous air in the from of ice crystals;

washing means for providing a flow of liquid air across the screen to wash the entrapped ice crystals therefrom; and collector means for collecting the liquid air from the washing means and ice crystals suspended therein.

* * * * *

UNITED STATES PATENT AND TRADEMARK OFFICE
CERTIFICATE OF CORRECTION

PATENT NO. : 4,893,471
DATED : January 16, 1990
INVENTOR(S) : Don W. Huling

It is certified that error appears in the above-identified patent and that said Letters Patent is hereby corrected as shown below:

In claim 16, column 8, line 12, delete "ar" and substitute therefor --air--.

In claim 16, column 8, line 22, delete "from" and substitute therefor --form--.

Signed and Sealed this

Fourteenth Day of May, 1991

Attest:

HARRY F. MANBECK, JR.

*Attesting Officer*      *Commissioner of Patents and Trademarks*